US012763434B2

(12) United States Patent
Che et al.

(10) Patent No.: US 12,763,434 B2
(45) Date of Patent: Oct. 13, 2026

(54) COVER ASSEMBLY, BATTERY AND BATTERY PACK

(71) Applicant: AESC Japan Ltd., Kanagawa (JP)

(72) Inventors: Peipei Che, Jiangsu (CN); Jia Qian, Jiangsu (CN); Shengrong Cao, Jiangsu (CN); Tianqi Lu, Jiangsu (CN)

(73) Assignee: AESC Japan Ltd., Kanagawa (JP)

( * ) Notice: Subject to any disclaimer, the term of this patent is extended or adjusted under 35 U.S.C. 154(b) by 536 days.

(21) Appl. No.: 18/518,442

(22) Filed: Nov. 23, 2023

(65) Prior Publication Data

US 2024/0297409 A1 Sep. 5, 2024

(30) Foreign Application Priority Data

Mar. 2, 2023 (CN) ........................ 202310209750.9

(51) Int. Cl.

*H01M 50/474* (2021.01)
*H01M 50/103* (2021.01)
*H01M 50/15* (2021.01)
*H01M 50/184* (2021.01)
*H01M 50/562* (2021.01)
*H01M 50/566* (2021.01)
*H01M 50/567* (2021.01)

(52) U.S. Cl.

CPC ....... *H01M 50/474* (2021.01); *H01M 50/103* (2021.01); *H01M 50/15* (2021.01); *H01M 50/184* (2021.01); *H01M 50/562* (2021.01); *H01M 50/566* (2021.01); *H01M 50/567* (2021.01)

(58) Field of Classification Search

CPC ............................ H01M 50/15; H01M 50/474
See application file for complete search history.

(56) References Cited

U.S. PATENT DOCUMENTS

2015/0295221 A1* 10/2015 Urano ................ H01M 50/528 429/61

FOREIGN PATENT DOCUMENTS

JP 2021005468 A * 1/2021

* cited by examiner

*Primary Examiner* — Barbara L Gilliam
*Assistant Examiner* — Benjamin T Lustgraaf
(74) *Attorney, Agent, or Firm* — JCIPRNET

(57) ABSTRACT

Disclosed are a cover assembly, a battery and a battery pack. The cover assembly includes a cover plate, an electrode plate, a first insulator and a second insulator. The electrode plate is disposed on the cover plate, and the electrode plate includes a first electrode portion and a second electrode portion electrically connected to each other. The first insulator is disposed between the electrode plate and the cover plate, and the second insulator is disposed on one side of the electrode plate away from the cover plate. The area of the first insulator corresponding to the first electrode portion is provided with a first through hole, the area of the second insulator corresponding to the second electrode portion is provided with a second through hole, and the orthographic projections of the first through hole and the second through hole on the cover plate do not overlap each other.

17 Claims, 3 Drawing Sheets

COVER ASSEMBLY, BATTERY AND BATTERY PACK

CROSS-REFERENCE TO RELATED APPLICATION

This application claims the priority benefit of China patent application no. 202310209750.9, filed on Mar. 2, 2023. The entirety of the above-mentioned patent application is hereby incorporated by reference herein and made a part of this specification.

BACKGROUND

Technical Field

The disclosure relates to a cover assembly, a battery and a battery pack.

Description of Related Art

At present, lithium-ion batteries generally guide the current from the inside of the battery housing to the outside of the battery housing through the electrode pole. The conventional electrode pole structure adopted by the top cover of most battery cell is that the outer electrode pole of the battery cell enters the interior of the battery cell housing in the manner of being perpendicular to the top cover. In this way, when the battery is electrically connected to the outer environment, the solder joint between the electrode pole and the battery cell tab and the solder joint between electrode pole and external electrical connector have a same height of the electrode pole. Such configuration is likely to affect the other end of the welded electrode pole when welding one end of the electrode pole, and the electrical conductivity of the electrode pole might be affected accordingly.

SUMMARY

The disclosure provides a cover assembly, a battery and a battery pack in order to solve a problem caused by the defect of related art in which the solder joint between the electrode pole of battery and the battery cell tab in the housing is in the same height as the solder joint between the electrode pole and the external electrical connector.

The present disclosure solves the above technical problems through the following technical solutions:

The disclosure provides a cover assembly, which includes:

- a cover plate;
- an electrode plate, the electrode plate is disposed on the cover plate, and the electrode plate includes a first electrode portion and a second electrode portion electrically connected to each other;
- a first insulator and a second insulator, the first insulator is disposed between the electrode plate and the cover plate, and the second insulator is disposed on one side of the electrode plate away from the cover plate;
- wherein an area of the first insulator corresponding to the first electrode portion is provided with a first through hole, an area of the second insulator corresponding to the second electrode portion is provided with a second through hole, and the orthographic projections of the first through hole and the second through hole on the cover plate do not overlap each other.

In this solution, the cover assembly adopts the above-mentioned structure, in which the electrode plate is disposed on the cover plate, and insulators are disposed on both sides of the electrode plate to ensure that the electrode plate and the cover plate are insulated from each other. By misaligning the through holes corresponding to the connection portion of the electrodes on the two insulators, when the two electrodes of the electrode plate are connected to the battery cell tab and the external electrical connectors respectively, the solder joint between the external electrical connector and the electrode plate and the solder joint between the battery cell tab and the electrode plate are not in the same height direction. In this way, it is possible to avoid the situation caused by adopting the conventional electrode pole structure, that is, when one end of the electrode pole is welded, the other end of the welded electrode pole will be affected. Accordingly, the adverse effect on the conductivity performance of the electrode plate may be effectively reduced. Moreover, adopting the structure of this solution also facilitates abutting against the welding part during welding, which ensures stability during welding and reduces the rate of defective welding.

Preferably, the first electrode portion and the second electrode portion are arranged laterally.

In this solution, by adopting the above-mentioned electrode plate structure and replacing electrode plates of different lengths, the electrode portion of the electrode plate may be extended to the position of the battery cell tab and welded with the battery cell tab. In this way, it is possible to avoid disadvantages of using adapters for electrical connection when the conventional battery electrode pole and battery cell tab are not in the same height direction. Accordingly, not only productivity, excellent rate and safety performance are improved, and it is also possible to avoid increasing the internal resistance of the structure when connecting the electrode pole and battery cell tab through the adapter. Furthermore, the power performance of the battery cell is improved, and the overall height of the battery pack may be reduced when the battery pack is formed, and the energy density of the battery pack may be improved.

Preferably, a third through hole is provided on an area of the cover plate corresponding to the first electrode portion, and a first annular protrusion extending toward the cover plate is provided on an outer periphery edge of the first through hole of the first insulator, and an outer peripheral surface of the first annular protrusion matches the inner peripheral surface of the third through hole.

In this solution, by setting the annular protrusion on the first insulator and matching with the third through hole on the cover plate, it is possible for the first insulator to keep at a relative position from the cover plate, so as to avoid that position deviation occurs when the first insulator is assembled with the electrode plate and cover plate and further affects the insulation protection of the electrode plate.

Preferably, at least one of the first electrode portion and the second electrode portion protrudes from the surface of the electrode plate and protrude into corresponding through holes.

In this solution, the first electrode portion or the second electrode portion protrudes outward from the surface of the electrode plate, which may facilitate welding with tabs or external electrical connectors and improve production efficiency.

Preferably, a groove is provided on the cover plate, and the electrode plate is arranged in the groove.

In this solution, by arranging the electrode plate in the groove of the cover plate, the height of the cover assembly may be reduced, thereby reducing the height of the battery and increasing the energy density of the battery.

Preferably, the cover plate is a cover substrate, a plastic plate is provided on one side of the cover plate away from the electrode plate, and a through hole corresponding to the third through hole is provided on the plastic plate.

Preferably, the cover assembly further includes a sealing ring, the sealing ring includes a main body portion and a flange provided on the outer peripheral side of one end of the main body portion. The two end surfaces of the flange respectively press against the electrode plate and the cover plate, the outer peripheral surface of the main body portion is attached to the inner wall surface of the third through hole.

In this solution, the sealing ring is configured to seal between the cover plate and the electrode plate, so as to prevent external dust and liquid from entering the housing of the battery cell and affecting the safety performance of the battery cell.

Preferably, the cover assembly further includes a fixing plate, the fixing plate is covered on one side of the electrode plate away from the cover plate, and the area on the fixing plate corresponding to the second electrode portion is provided with a fourth through hole.

In this solution, the electrode plate is press-fitted in the middle by setting the fixing plate, so that the joint surface of the two electrode portions of the electrode plate may not have to bear a large force perpendicular to the joint surface, thus improving the reliability of the electrode plate, and reducing the overall thickness requirements of welding on the electrode plate.

Preferably, the fixing plate has a receiving groove, the outer peripheral edge of the receiving groove is provided with an extending edge parallel to the cover plate, and the extending edge is welded and fixed to the cover plate.

In this solution, the above-mentioned structure is adopted to facilitate welding and fixing the fixing plate to the cover plate.

Preferably, a second annular protrusion extending toward the fixing plate is provided on an outer peripheral edge of the second through hole of the second insulator, and an outer peripheral surface of the second annular protrusion matches the inner peripheral surface of the fourth through hole.

In this solution, by setting the second annular protrusion on the second insulator and matching the second annular protrusion with the fourth through hole on the fixing plate, the position of the fixing plate may be limited to prevent the fixing plate from moving during welding and affecting the welding.

Preferably, at least one of the first insulator and the second insulator is a plastic plate.

In this solution, the first insulator and the second insulator are made of plastic plates, which is convenient for processing and cost-effective.

Preferably, the first electrode portion and the second electrode portion are fixed by welding or riveting.

Preferably, the first electrode portion and the second electrode portion are made of two conductive metals of different materials.

Preferably, the material of the first electrode part is copper, and the material of the second electrode portion is aluminum.

Preferably, the electrode plate, the first electrode portion and the second electrode portion are made integrally of the same metal.

The present disclosure further provides a battery, the battery including the above-mentioned cover assembly.

The battery further includes a housing and a battery cell disposed in the housing, the battery cell has a tab, the cover assembly is covered on the housing, the first electrode portion is electrically connected to the tab.

The present disclosure further provides a battery pack, which includes a plurality of batteries as described above, and the plurality of batteries are connected in series or in parallel through the second electrode portion.

On the basis of conforming to common knowledge in the field, the above-mentioned preferred conditions may be combined freely to obtain preferred examples of the present disclosure.

The positive advantageous effect of the present disclosure is that: the cover assembly of the present disclosure arranges the electrode plate on the cover plate, and insulators are arranged on both sides of the electrode plate to ensure that the electrode plate and the cover plate are insulated from each other. By misaligning the through holes corresponding to the connection portion of the electrodes on the two insulators, when the two electrodes of the electrode plate are connected to the battery cell tab and the external electrical connectors respectively, the solder joint between the external electrical connector and the electrode plate and the solder joint between the battery cell tab and the electrode plate are not in a same height. In this way, it is possible to avoid the situation resulted from adopting the conventional electrode pole structure, that is, when welding one end of the electrode pole, the other welded end of the electrode pole will be affected. Accordingly, the adverse effect on the conductivity performance of the electrode plate may be effectively reduced. Moreover, adopting the structure of this solution also facilitates abutting against the welding part during welding, which ensures stability during welding and reduces the rate of defective welding.

DESCRIPTION OF THE EMBODIMENTS

The present disclosure is further illustrated below by means of examples, but the present disclosure is not limited to the scope of the following examples.

Embodiment 1

Figure 1:
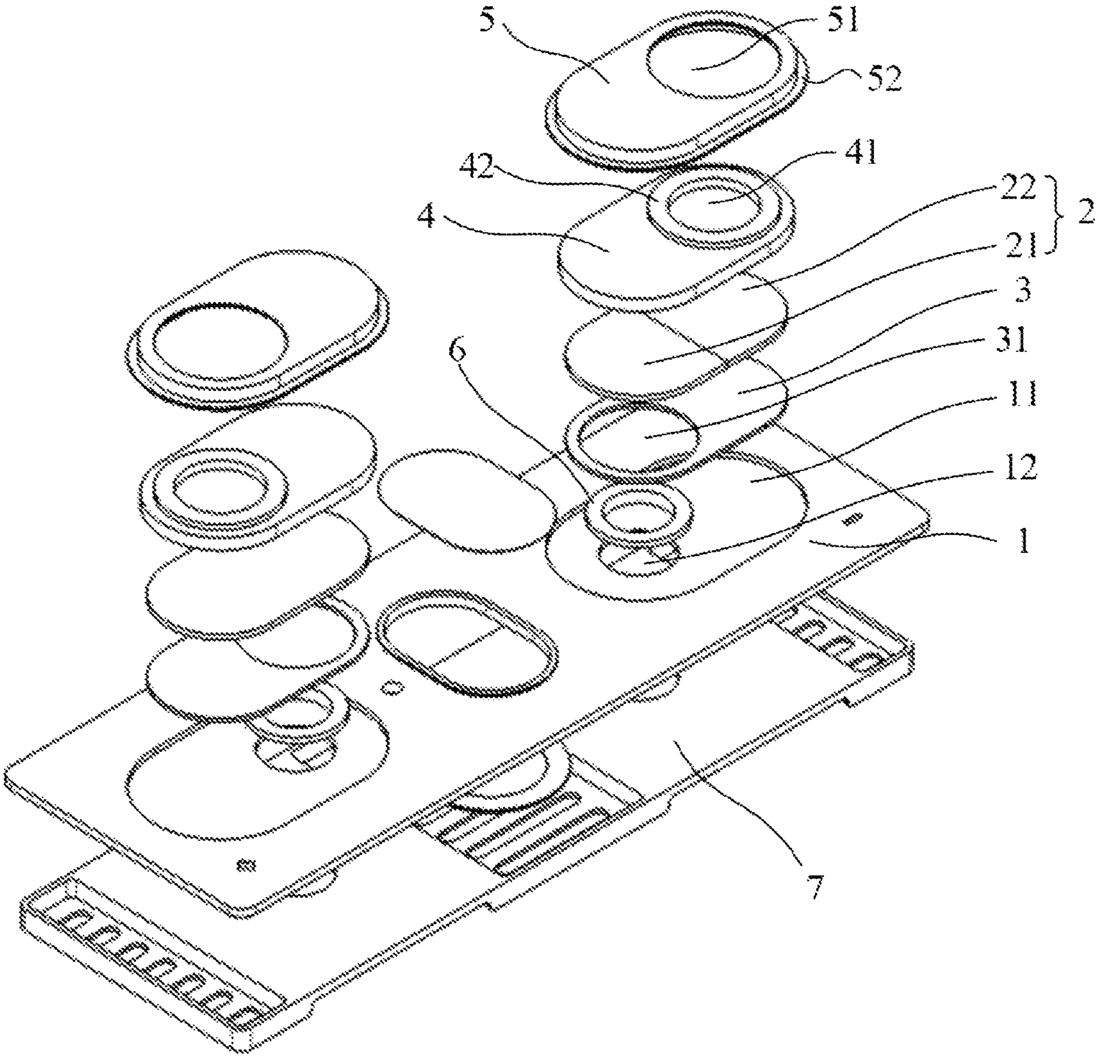
FIG. 1 is a schematic diagram of an exploded structure of a cover assembly in Embodiment 1 of the present disclosure.
Figure 2:
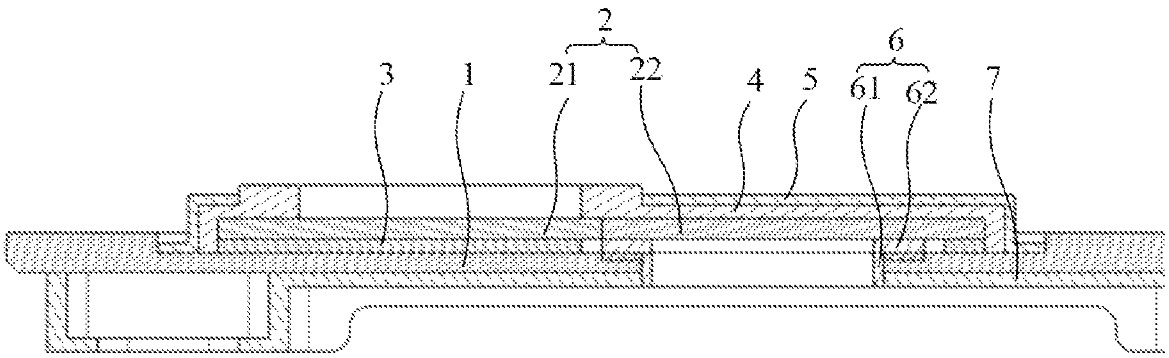
FIG. 2 is a partial sectional view of the cover assembly in Embodiment 1 of the present disclosure.
Figure 3:
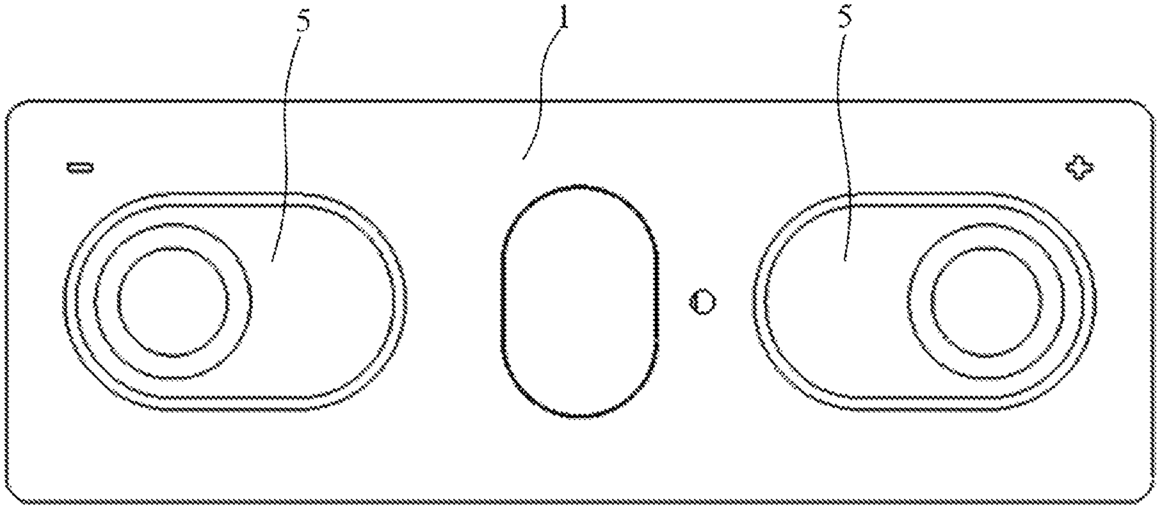
FIG. 3 is a top view of the cover assembly in Embodiment 1 of the present disclosure.

As shown in FIG. 1 to FIG. 3, this embodiment provides a cover assembly, which includes a cover plate 1, an electrode plate 2, a first insulator 3 and a second insulator 4, the electrode plate 2 is disposed on the cover plate 1, and the electrode plate 2 includes a first electrode portion 21 and a second electrode portion 22 electrically connected to each other. The first insulator 3 is disposed between the electrode plate 2 and the cover plate 1, and the second insulator 4 is arranged on one side of the electrode plate 2 away from the cover plate 1. An area of the first insulator 3 corresponding to the first electrode portion 21 is provided with a first through hole 31, and an area of the second insulator 4 corresponding to the second electrode portion 22 is provided with a second through hole 41. Orthographic projections of the first through hole 31 and the second through hole 41 on the cover plate 1 do not overlap each other.

The electrode plate 2 is placed on the cover plate 1, and insulators are provided on both sides of the electrode plate 2 to ensure that the electrode plate 2 and the cover plate 1 are insulated from each other. By misaligning the through holes corresponding to the connection portion of the electrodes on the two insulators, when the two electrodes of the electrode plate 2 are connected to the battery cell tab and the external electrical connectors respectively, the solder joint between the external electrical connector and the electrode plate 2 and the solder joint between the battery cell tab and the electrode plate 2 are not in a same height. In this way, it is possible to avoid the situation resulted from adopting the conventional electrode pole structure, that is, when welding one end of the electrode pole, the other welded end of the electrode pole will be affected. Accordingly, the adverse effect on the conductivity performance of the electrode plate 2 may be effectively reduced. Moreover, adopting the structure of this solution also facilitates abutting against the welding part during welding, which ensures stability during welding and reduces the rate of defective welding. In the case of adopting the conventional electrode pole structure, when one end of the electrode pole is welded and then the other end is to be welded, the welded end needs to lean against some object corresponding to one welded end in order to weld the other end, which will cause the welded end to lean against the solder joint, and therefore welding is unstable, and the soldering yield will be affected.

The first electrode portion 21 and the second electrode portion 22 are arranged laterally. By using the above structure of the electrode plate 2 and changing the electrode plate 2 with different lengths, it is possible to make the electrode portion of the electrode plate 2 extend to the position of the battery cell tab and weld with the battery cell tab. In this way, it is possible to avoid disadvantages of using adapters for electrical connection when the conventional battery electrode pole and battery cell tab are not in the same height. Accordingly, not only productivity, yield and safety performance are improved, and it is also possible to avoid increasing the internal resistance of the structure when connecting the electrode pole and battery cell tab through the adapter. Furthermore, the power performance of the battery cell is improved. On the other hand, the first electrode portion 21 and the second electrode portion 22 arranged laterally are different from the conventional electrode portions which are stacked in the vertical direction, which may reduce the thickness of the electrodes, thereby reducing the overall thickness of the battery cell.

Specifically, in this embodiment, both the first electrode portion 21 and the second electrode portion 22 are thin-sheet structures and are conductive metals of two different materials. The thickness surfaces of two thin sheets are joined and fixed by welding or riveting to form an electrode plate with a flat plate structure 2. For example, in a specific scenario, the electrode plate 2 is a negative electrode of the battery, the material of the first electrode portion 21 is copper, and the material of the second electrode portion 22 is aluminum. The first electrode portion 21 is made of copper to facilitate welding with the battery cell tab made of copper material, and the second electrode portion 22 is made of aluminum to facilitate welding with the bus bar made of aluminum. Of course, in some embodiments, the material of the first electrode portion 21 and the second electrode portion 22 may be selected according to the material of the part to be welded.

In some embodiments, the electrode plate 2, the first electrode portion 21 and the second electrode portion 22 are made integrally of the same metal. For example, in a specific scenario, the electrode plate 2 is the positive pole of the battery, and the first electrode portion 21 and the second electrode portion 22 are some areas of the electrode plate 2 respectively.

The first electrode portion 21 and the second electrode portion 22 do not protrude from the surface of the electrode plate 2, and some areas of the electrode plate 2 are used as the first electrode portion 21 and the second electrode portion 22, which may simplify the electrode plate structure of the battery and save costs. Moreover, when the external electrical connector needs to be connected to the second electrode portion 22, the external electrical connector may be inserted through the second through hole 41. When the battery cell tab needs to be connected to the first electrode portion 21, the battery cell tab may be inserted through the first through hole 31. Thereby, it is possible to save the space of the battery as a whole in terms of thickness.

As shown in FIG. 1, the area corresponding to the first electrode portion 21 on the cover plate 1 is provided with a third through hole 12, which is convenient for welding the battery cell tab and the first electrode portion 21 when the cover assembly is arranged on the housing of the battery cell.

In some embodiments, a first annular protrusion extending toward the cover plate 1 is provided on an outer peripheral edge of the first through hole 31 of the first insulator 3, and the outer peripheral surface of the first annular protrusion is aligned with the inner peripheral surface of the third through hole 12. By setting an annular protrusion on the first insulator 3 and matching with the third through hole 12 on the cover plate 1, it is possible for the first insulator 3 to keep at a relative position from the cover plate 1, so as to avoid that position deviation occurs when the first insulator 3 is assembled with the electrode plate 2 and cover plate 1 and to avoid further affecting the insulation protection of the electrode plate 2. Preferably, the first annular protrusion should not protrude from the third through hole 12, so as to avoid interference between the first annular protrusion and the battery cell tab when the cover assembly is disposed on the housing of the battery cell.

As shown in FIG. 1, a groove 11 is provided on the cover plate 1, and the electrode plate 2 is disposed in the groove 11. By arranging the electrode plate 2 in the groove 11 of the cover plate 1, the height of the cover assembly may be reduced, thereby reducing the height of the battery and increasing the energy density of the battery.

In this embodiment, there are two grooves 11 on the cover plate 1, which are respectively located at both ends of the cover plate 1. Electrode plates 2 are respectively provided in the two grooves 11 for electrical connection with the positive and negative tabs of the battery cell. Certainly, in some embodiments, the groove 11 may not be provided on the cover plate 1.

In this embodiment, the cover plate 1 is a cover substrate, one side of the cover plate 1 facing away from the electrode plate 2 is provided with a plastic plate 7, and a through hole corresponding to the third through hole 12 is formed on the plastic plate 7. The cover plate 1 adopts the cover substrate, which not only has high strength, but also is easy to process. A plastic plate 7 is provided on one side of the cover plate 1 facing away from the electrode plate 2 to avoid accidental contact between the battery cell tab and the cover plate 1, resulting in leakage of electricity from the housing. The material of the cover substrate in the present embodiment is aluminum, but not limit thereto. In other embodiments, the cover substrate may also be made of other materials.

In some embodiments, the cover plate 1 may also be made of other materials, and if the cover plate 1 is made of insulating material, the plastic plate 7 may not be provided.

As shown in FIG. 1 and FIG. 2, the cover assembly further includes a sealing ring 6, and the sealing ring 6 includes a main body portion 61 and a flange 62 arranged on the outer peripheral side of one end of the main body portion 61. Both end surfaces of the flange 62 are respectively pressed against the electrode plate 2 and the cover plate 1, and the outer peripheral surface of the main body portion 61 is attached to the inner wall surface of the third through hole 12. The sealing ring 6 is provided to seal the gap between the cover plate 1 and the electrode plate 2, so as to prevent external dust and liquid from entering the housing of the battery cell and affecting the safety performance of the battery cell.

The cover assembly further includes a fixing plate 5, which covers one side of the electrode plate 2 away from the cover plate 1, and a fourth through hole 51 is formed on an area of the fixing plate 5 corresponding to the second electrode portion 22. By setting the fixed plate 5 to press-fit the electrode plate 2 in the middle, the joint surface of the two electrode portions of the electrode plate 2 may not have to bear a large force perpendicular to the joint surface, thereby improving the reliability of the electrode plate 2, and reducing the overall thickness requirements of welding on the electrode plate 2.

In this embodiment, the fixing plate 5 has a receiving groove, and the outer peripheral edge of the receiving groove is provided with an extending edge 52 parallel to the cover plate 1, and the extending edge 52 is welded and fixed to the cover plate 1. With the above structure, it is convenient to weld and fix the fixing plate 5 on the cover plate 1.

In this embodiment, a second annular protrusion 42 extending toward the fixing plate 5 is provided on an outer peripheral edge of the second through hole 41 of the second insulator 4, and the outer peripheral surface of the second annular protrusion 42 matches the inner peripheral surface of the fourth through hole 51. By setting the second annular protrusion 42 on the second insulator 4 and matching the second annular protrusion 42 with the fourth through hole 51 on the fixing plate 5, the position of the fixing plate 5 may be limited to prevent the fixing plate 5 from moving during welding and affecting the welding. Whether the second annular protrusion 42 protrudes from the fourth through hole 51 may be selected according to actual conditions, and there is no limitation here.

In some embodiments, the second insulator 4 may not be provided with an annular protrusion.

In this embodiment, the first insulator 3 and the second insulator 4 are plastic plates, and the first insulator 3 and the second insulator 4 are made of plastic plates, which is convenient for processing and cost-effective. In other embodiments, the first insulator 3 and the second insulator 4 may also be made of other insulating materials.

This embodiment further provides a battery, which includes the above cover assembly. The battery further includes a housing and a battery cell disposed in the housing, the battery cell has a battery cell tab, the cover assembly is covered on the housing, and the first electrode portion 21 is electrically connected to the battery cell tab.

This embodiment further provides a battery pack, which includes a plurality of batteries as above, and the plurality of batteries are connected in series or in parallel through the second electrode portion 22. Specifically, multiple batteries are assembled into a battery pack, and bus bars are used to respectively connect the second electrode portions 22 on the positive and negative electrodes of different batteries, so that multiple batteries are connected in series or in parallel.

Embodiment 2

Figure 4:
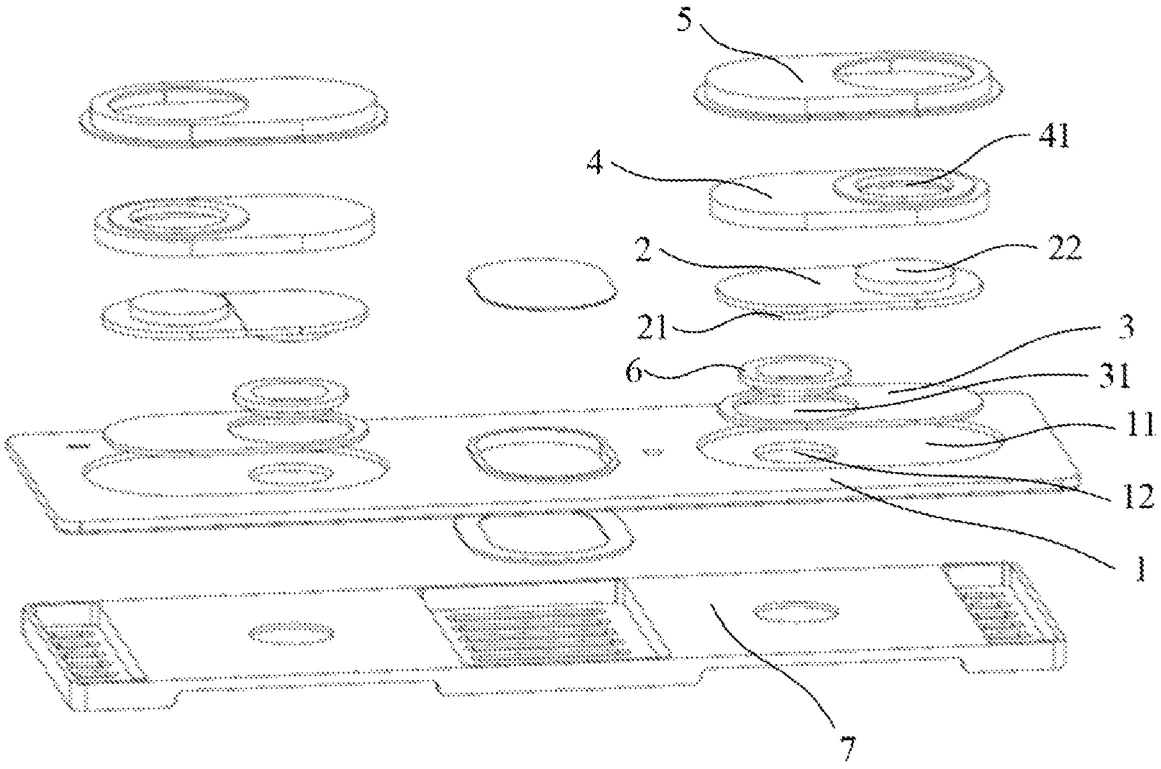
FIG. 4 is a schematic diagram of an exploded structure of the cover assembly in Embodiment 2 of the present disclosure.
Figure 5:
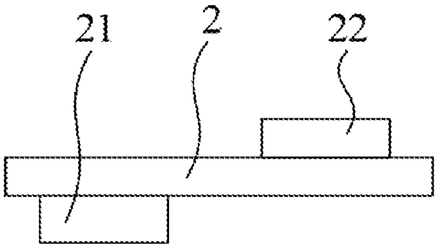
FIG. 5 is a schematic structural view of an electrode plate in Embodiment 2 of the present disclosure.

As shown in FIG. 4 and FIG. 5, the structure of the cover assembly in the present embodiment is substantially the same as that of the cover assembly in Embodiment 1, and the difference between them is that in this embodiment, the first electrode portion 21 and the second electrode portion 22 on the electrode plate 2 respectively protrude outward from the surface of the electrode plate 2. The first electrode portion 21 is inserted into the first through hole 31, and the second electrode portion 22 is inserted into the second through hole 41. The first electrode portion 21 and the second electrode portion 22 protrude outward from the surface of the electrode plate 2 and insert into corresponding through holes, which may facilitate welding with tabs or external electrical connectors and improve production efficiency.

In some embodiments, only the first electrode portion 21 or the second electrode portion 22 protrudes outward from the surface of the electrode plate 2, and the details will not be repeated here.

Although the specific implementation of the present disclosure has been described above, those skilled in the art should understand that this is only an example, and the protection scope of the present disclosure is defined by the appended claims. Those skilled in the art can make various changes or modifications to these embodiments without departing from the principle and essence of the present disclosure, but these changes and modifications all fall within the protection scope of the present disclosure.

What is claimed is:

1. A cover assembly, comprising:

a cover plate;

an electrode plate, which is disposed on the cover plate, wherein the electrode plate comprises a first electrode portion and a second electrode portion electrically connected to each other;

a first insulator and a second insulator, wherein the first insulator is disposed between the electrode plate and the cover plate, and the second insulator is disposed on one side of the electrode plate away from the cover plate;

an area of the first insulator corresponding to the first electrode portion is provided with a first through hole, an area of the second insulator corresponding to the second electrode portion is provided with a second through hole, and orthographic projections of the first through hole and the second through hole on the cover plate do not overlap each other.

2. The cover assembly according to claim 1, wherein the first electrode portion and the second electrode portion are arranged laterally.

3. The cover assembly according to claim 1, wherein a third through hole is provided on an area of the cover plate corresponding to the first electrode portion, and a first annular protrusion extending toward the cover plate is provided on an outer periphery edge of the first through hole of the first insulator, and an outer peripheral surface of the first annular protrusion matches an inner peripheral surface of the third through hole.

4. The cover assembly according to claim 3, wherein the cover plate is a cover substrate, a plastic plate is provided on one side of the cover plate away from the electrode plate, and a through hole corresponding to the third through hole is provided on the plastic plate.

5. The cover assembly according to claim 3, wherein the cover assembly further comprises a sealing ring, the sealing ring comprises a main body portion and a flange provided on an outer peripheral side of one end of the main body portion, two end surfaces of the flange respectively press against the electrode plate and the cover plate, an outer peripheral surface of the main body portion is attached to an inner wall surface of the third through hole.

6. The cover assembly according to claim 1, wherein at least one of the first electrode portion and the second electrode portion protrudes from a surface of the electrode plate and protrude into corresponding through holes.

7. The cover assembly according to claim 1, wherein a groove is provided on the cover plate, and the electrode plate is disposed in the groove.

8. The cover assembly according to claim 1, wherein the cover assembly further comprises a fixing plate, the fixing plate is covered on one side of the electrode plate away from the cover plate, and an area on the fixing plate corresponding to the second electrode portion is provided with a fourth through hole.

9. The cover assembly according to claim 8, wherein the fixing plate has a receiving groove, an outer peripheral edge of the receiving groove is provided with an extending edge parallel to the cover plate, and the extending edge is welded and fixed to the cover plate.

10. The cover assembly according to claim 8, wherein a second annular protrusion extending toward the fixing plate is provided on an outer peripheral edge of the second through hole of the second insulator, and an outer peripheral surface of the second annular protrusion matches an inner peripheral surface of the fourth through hole.

11. The cover assembly according to claim 1, wherein at least one of the first insulator and the second insulator is a plastic plate.

12. The cover assembly according to claim 1, wherein the first electrode portion and the second electrode portion are fixed by welding or riveting.

13. The cover assembly according to claim 1, wherein the first electrode portion and the second electrode portion are made of two conductive metals of different materials.

14. The cover assembly according to claim 13, wherein a material of the first electrode part is copper, and a material of the second electrode portion is aluminum.

15. The cover assembly according to claim 1, wherein the electrode plate, the first electrode portion and the second electrode portion are made integrally of a same metal.

16. A battery, comprising the cover assembly according to claim 1;

wherein the battery further comprises a housing and a battery cell disposed in the housing, the battery cell has a tab, the cover assembly is covered on the housing, and the first electrode portion is electrically connected to the tab.

17. A battery pack, comprising a plurality of the batteries according to claim 16, and the plurality of batteries being connected in series or in parallel through the second electrode portion.

* * * * *